United States Patent [19]

Hop

[11] Patent Number: 4,912,756
[45] Date of Patent: Mar. 27, 1990

[54] METHOD AND APPARATUS FOR ERROR-FREE DIGITAL DATA TRANSMISSION DURING CELLULAR TELEPHONE HANDOFF, ETC.

[75] Inventor: David D. Hop, Phoenix, Ariz.

[73] Assignee: Unilink Corporation, Scottsdale, Ariz.

[21] Appl. No.: 335,147

[22] Filed: Apr. 7, 1989

[51] Int. Cl.⁴ .............................................. H01Q 7/04
[52] U.S. Cl. ....................................... 379/60; 155/33; 155/54; 379/63; 379/59
[58] Field of Search ........................ 379/59, 60, 91, 63, 379/57, 58, 56; 455/33, 54, 56, 58, 34

[56] References Cited

U.S. PATENT DOCUMENTS

| | | | |
|---|---|---|---|
| 4,369,516 | 1/1983 | Byrns | 375/110 |
| 4,613,990 | 9/1986 | Halpern | 455/33 |
| 4,654,867 | 3/1987 | Labedz et al. | 379/59 |
| 4,696,027 | 9/1987 | Bonta | 379/60 |
| 4,697,281 | 9/1987 | O'Sullivan | 379/59 |

OTHER PUBLICATIONS

"Firm Unveils Cellular Bridge" Infoworld by Jim Bartimo, 7/2/84, pp. 11–12.

"Solving Cellular Data Transmission Problems" Telephony, Dec. 1, 1986, by Greg Fontana, pp. 36–40.

Primary Examiner—Robert Lev
Attorney, Agent, or Firm—Cahill, Sutton & Thomas

[57] ABSTRACT

A system for providing error-free data communication between first and second personal computers over a conventional cellular telephone system includes an interface adapter coupling the first personal computer to the TDATA, CDATA, and RDATA conductors of a Cellular Subscriber Equipment unit and a cellular connector coupling a modem of the first personal computer to the audio $R_x$ and $T_x$ conductors of the Cellular Subscriber Equipment unit. Data communication between the first and second personal computers is carried over the voice channel of the cellular telephone system. The interface adapter recognizes imminent interfering activity such as a handoff or power adjustment operation or multipath fading by monitoring the TDATA, CDATA, and RDATA conductors of the control channel of the cellular telephone system and so informs the first personal computer. The first personal computer executes a bus monitor program that halts the data communication between the first and second personal computers until the interfering activity is completed.

21 Claims, 4 Drawing Sheets

METHOD AND APPARATUS FOR ERROR-FREE DIGITAL DATA TRANSMISSION DURING CELLULAR TELEPHONE HANDOFF, ETC.

BACKGROUND OF THE INVENTION

The invention relates to a mobile cellular telephone system having the capability of transmitting digital data without errors caused by handoff operations, power adjusting operations, multipath fading, and the like.

Mobile cellular radiotelephone service is readily available. A cellular system has a coverage area divided into contiguous smaller coverage "cells" using low power transmitters and receivers. The limited cell area enables the channel frequencies in one cell to be reused in another geographically separated cell according to an established scheme. Thus, a large number of channels can be made available in a metropolitan area and service can appear to be identical to that of a standard telephone. The cellular system typically utilizes one channel in each cell, called a "control channel", to receive requests for service from subscriber units to call other subscriber units and to instruct subscriber units (also referred to herein as "mobile telephone units") to tune to a frequency pair of a selected "voice channel" wherein a two-way (duplex) conversation may take place. The control channel continuously receives and transmits data and is the channel to which a mobile telephone unit automatically tunes when not in a voice conversational state.

Since the cells may be of relatively small size, typically ten miles in radius, the likelihood of a mobile telephone unit traveling out of one cell and into another is high. To maintain uninterrupted communications, the mobile telephone unit is "handed off" between one cell and another. The cell systems track the mobile telephone unit and decide when a "handoff" operation is necessary to maintain high quality communication. The mobile telephone unit is commanded by a high speed data message which interrupts the audio communications on a voice channel to re-tune the transceiver to another frequency that presently is available in a new cell to which the mobile telephone unit is "handed off". This handoff operation requires a relatively short period of time (200 to 700 milliseconds), and the mobile telephone user usually is unaware of the occurrence.

Digital data messages usually are transmitted in a Manchester encoded format, which is well known by those skilled in the art. This digital transmission system has been thoroughly studied for application to high capacity mobile telephone systems. Immunity to radio channel fading and other performance characteristics have been reported. Since cellular telephone systems interconnect with and provide performance that is characteristic of ordinary land line telephone systems, subscribers also tend to expect identical or similar capabilities and characteristics from a cellular telephone system. One such capability is the transmission of digital data via a mobile telephone unit from one location to another. Many telephone subscribers connect data communication devices such as a personal computer (PC) to the telephone system via a modem. Modems are familiar to those skilled in the art and operate by converting digital "one" and "zero" levels to distinct tones or to particular tone waveforms which can be transmitted by the land telephone network.

It would be very desirable for owners of portable personal computers to be able to couple them via a modem, a mobile telephone unit, and a cellular telephone system to another remote computer. Unfortunately, this has been problematical. Various systems have been devised to solve the digital data communication problems caused by the above mentioned "handoff" problem and other automatic operations that require interruption of digital data transmission/reception, but none of the known systems has been completely satisfactory. During handoff or other interruption such as adjustment of transmitter power level, the personal computers of both the mobile telephone unit and the transmitter of the base site controller presently communicating with the mobile telephone unit cause both the mobile telephone unit and the transmitter of the base site controller to halt all digital communication for the above-mentioned 200 to 700 millisecond interval during which the handoff, power adjustment, or other similar operation takes place. The personal computers which may have been communicating during such operation have no way of knowing about the 200 to 700 millisecond delay, and as a result digital data is lost, and also there is an insertion of a burst of up to 463 bits of information and commands onto the voice channel from the control channel during the handoff operation or similar operation.

Pat. No. 4,654,867 (Labedz et al) describes a technique for dealing with this problem by accomplishing digital data transmission between personal computers over the control channels. More specifically, the system described in the Labedz patent requires all data communication between a "local" PC (personal computer) and a "remote" PC to occur at high speed (up to 9600 bits per second) over the control channel of the cellular telephone system. Consequently, complex equipment is needed at each end of the cellular telephone communication link for the purpose of converting the data from low "voice channel" modem speeds to "control channel" speeds of up to 9600 bits per second and then converting the data back down to the low voice channel modem speeds The complex equipment also must change the data format to allow transmission over the control channel, and then must change the data format back to its original format suitable for transmission over the voice channel. This complexity of the Labedz system adds greatly to its cost. Furthermore, that system is only compatible with other identical systems, but not with IBM-compatible and other popular personal computer systems.

Another system is described in Pat. No. 4,697,281 to effectuate data communication between two PC's over a voice channel of a cellular telephone system. That system requires large buffers in units connected to each PC to temporarily store all data that has a possibility of being lost during a handoff, and both units continually compare the contents of their respective buffers to determine if a handoff, power adjustment, or other interference occurred, and if it did, retransmits the data until the two buffers match.

It would be desirable to provide an inexpensive device which can be connected to any personal computer to enable it to communicate digital data over a cellular telephone system to a remote computer, such as an IBM PC or the like, without concern for loss of digital data during handoffs, power adjustments, and other like automatic operations that in the past have interfered with digital data transmission over cellular telephone systems.

SUMMARY OF THE INVENTION

Accordingly, it is an object of the invention to provide a simple, inexpensive device and method using a personal computer or the like to effectuate reliable data transmission over a cellular telephone system despite automatic handoff, power level adjustment, multi-path fading, and the like and which overcome the above described shortcomings of the prior art.

Briefly described, and in accordance with one embodiment thereof, the invention provides a system for interfacing with a cellular telephone system to achieve reliable digital data transmission. A program executed by a first computer recognizes an imminent "interfering" operation such as a handoff or like operation, and sends an $X_{OFF}$ command over the voice channel and thereby blanks the voice channel and halts all digital data transmission or reception via the voice channel by both the first computer and the second computer. When the imminent interfering operation is complete, the completion is detected on a three wire bus, transmitted via an interface circuit and a control channel to the first computer, which recognizes the condition and transmits an $X_{ON}$ command via the modem and voice channel to the second computer and reinitiates digital data transmission and reception between the first and second computers via the voice channel of the cellular telephone system. More specifically, data lost during communications is avoided by reading states on the TDATA, CDATA, and RDATA conductors of a cellular subscriber equipment unit and converting those states to serial transmit signals and/or serial receive signals by means of an interface circuit while exchanging of digital data between the first and second computers occurs over the voice channel, operating the bus monitor program to recognize an imminent handoff, power adjustment, or multipath fading in response to the serial transmit signals and/or serial receive signals, exchanging of digital data between the first and second computers before the handoff, power adjustment, or multipath fading begins, and continuing the exchanging of digital data between the first and second computers after the handoff, power adjustment, or multipath fading ends.

BRIEF DESCRIPTION OF THE DRAWINGS

FIGS. 4A and 4B constitute a flowchart of a program executed by the mobile personal computer in the block diagram of FIG. 2 to effectuate error-free digital data transmission via the voice channel of the cellular telephone unit without errors during cellular telephone handoff operations and the like.

DETAILED DESCRIPTION OF THE PREFERRED EMBODIMENT

Figure 1:
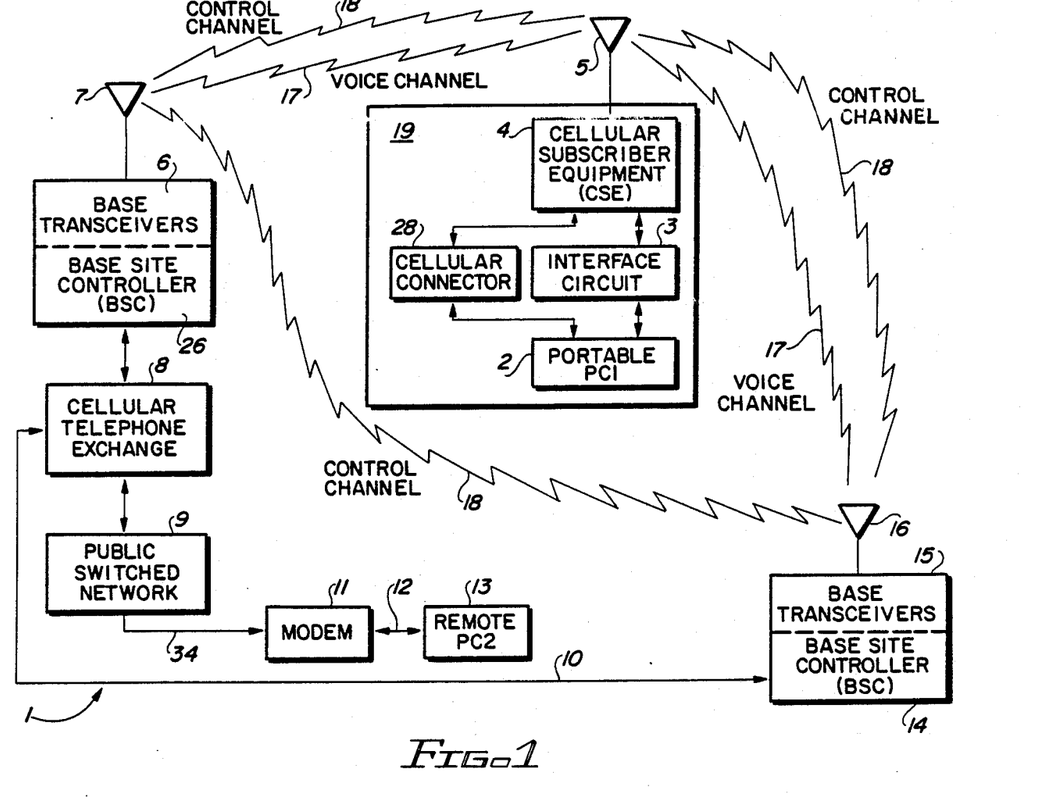
FIG. 1 is a block diagram of a cellular telephone system.

Referring to FIG. 1, cellular telephone system 1 includes a mobile unit 19 with a portable personal computer 2 (hereinafter referred to as the "portable PC 1") such as an IBM-Compatible PC. Mobile unit 19 also includes an interface circuit 3, a cellular connector 28, and a Cellular Subscriber Equipment (CSE) unit 4. Portable PC 1 is coupled by interface circuit 3 and cellular connector 28 of the present invention to CSE unit 4. CSE unit 4 can be any of a variety of commercially available units, such as a Motorola model 6800XL. CSE unit 4 is connected to a mobile antenna 5.

Cellular telephone system 1 includes a plurality of spaced "base sites", including a first base site having an antenna 7 connected to a plurality of base transceivers 6 which are controlled by Base Site Controller (BSC) 26. A second base site includes an antenna 16 connected to a plurality of base transceivers 15 which are controlled by a BSC 14. Both BSC 26 and BSC 14 are coupled to a conventional cellular telephone exchange 8 of a public telephone network. Cellular telephone exchange 8 is connected to a public switched network 9, which communicates via telephone line 34 (or other suitable communications link) to a remote personal computer 13 (hereinafter referred to as "remote PC 2"), which is connected by cable 12 and a standard computer modem 11 to the telephone line 34.

The mobile unit 19 including PC 1 and CSE unit 4 communicate with one of transceivers 6 and BSC 26 via antenna 5, an rf control channel 18 (over which data transmission at 9600 bits per second can be bidirectionally communicated), an rf voice channel 17 (over which digital data is bidirectionally communicated at 2400 bits per second), and antenna 7. CSE unit 4 also communicates with one of base transceivers 15 and BSC 14 via antenna 5, voice channel 17, control channel 18, and antenna 16. Base transceivers 6 and 15 also communicate with each other via antennas 7 and 16 and control channel 18.

Figure 2:
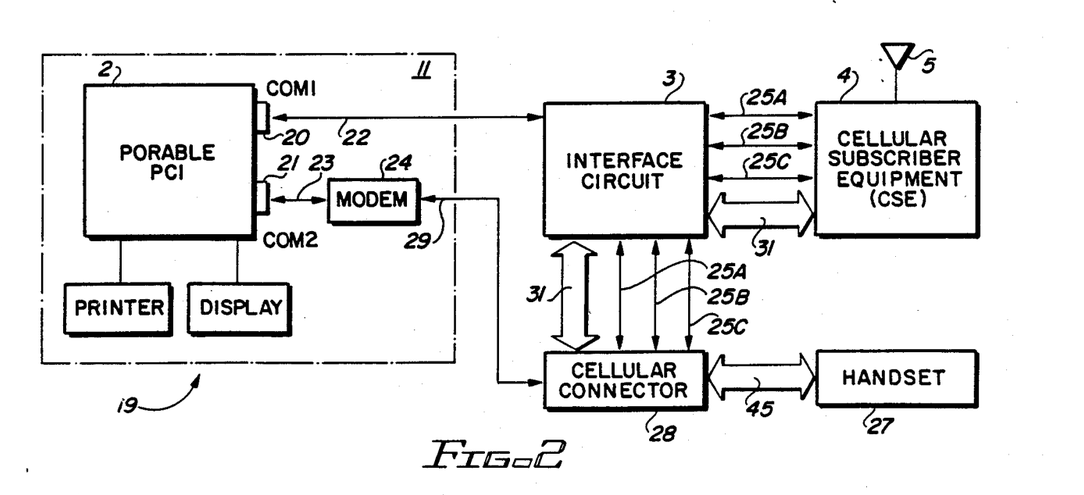
FIG. 2 is a block diagram illustrating the connection of a mobile personal computer to a standard mobile cellular telephone unit.
Figure 3:
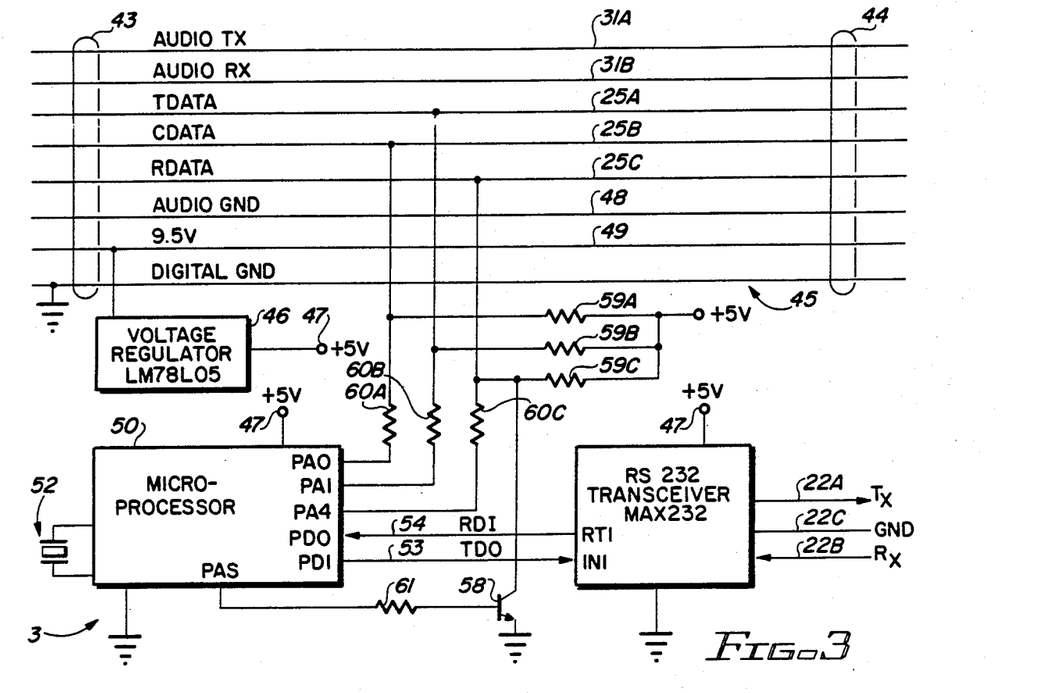
FIG. 3 is a detailed block diagram of the interface circuit shown in the diagram of FIG. 2.

Referring now to FIG. 2, portable PC 1 includes a first communications port 20, commonly referred to as the COM1 port, which is a conventional RS232 connector to which a bidirectional serial bus 22 is connected. Bus 22 is connected to interface circuit 3, the details of which are shown in FIG. 3. Interface circuit 3 is connected to the CSE 4 by a three-wire bus which includes TDATA (true data) conductor 25A, CDATA (complementary data) conductor 25B, and RDATA (return data) conductor 25C of CSE unit 4. Interface circuit 3 also is connected to CSE 4 by RX,TX conductors 31.

In accordance with the present invention, interface circuit 3 monitors "bus activity" on conductors 25A–C. Depending on the implementation of interface circuit 3, interface circuit 3 may recognize any of a number of "interference codes" that may appear on conductors 25A–C. Once a code has been recognized, interface circuit 3 communicates an indication of bus activity or a particular interference code via COM1 port 20 and serial bus 22 to portable PC 1.

COM2 port 21 is coupled by an RS232 connector and a bidirectional serial bus 23 to a standard computer modem 24. Modem 24 is coupled by cable 29 and a cellular connector 28 to a conventional mobile telephone handset 27, such as a Motorola model 6800XL. Cellular connector 28 can be a Motorola model 51565A. Cellular connector 28 is connected to the three-wire bus 25A–C and RX (receive), TX (transmit) cable 31, and performs the function of converting cellular "two way radio" signals to standard telephone "tip and ring" signals. Cellular connector 28 is connected by an 8 wire bus 45, which includes the same conductors shown in bus 45 in FIG. 3.

The portion of the mobile unit 19 shown in FIG. 2 surrounded by dotted line 11 can be included in a briefcase along with a printer and display to make it convenient for a user to connect the portable computer-printer-display system to CSE unit 4 and exchange data with remote PC 2 of FIG. 1.

Referring to FIG. 3, interface circuit 3 preferably is included in a small housing into which eight conductors, generally designated by numeral 45, within a coil cord from handset 27 (FIG. 2) are plugged. Numeral 43 represents a plug-in connector for the coil cord from handset 27. Numeral 44 designates connection of the individual conductors 45 to CSE unit 4. The eight conductors include the above-mentioned TDATA, CDATA, and RDATA signals, a 9½ volt power supply voltage conductor 49, an audio ground conductor 48, a logic ground conductor, and the above-mentioned audio $T_x$ and audio $R_x$ signals 31A and 31B included in bus 31 of FIG. 2.

Interface circuit 3 allows the eight conductors to feed through in an unimpeded fashion between CSE unit 4 and handset 27, and also allows "tapping onto" the TDATA, CDATA, and RDATA conductors 25A–C, respectively. The 9½ volt conductor 49 is applied as an input to a voltage regulator 46, which can be an LM78L05 type 5 volt regulator, to produce a regulated voltage on conductor 47 to power the circuitry in interface circuit 3. The CDATA and TDATA conductors are coupled, respectfully, to the PA0 and PA1 ports of microcontroller 50, which can be a Motorola MC68HC05C microcontroller containing both read only memory (ROM) and random access memory (RAM). The PA4 port is connected to RDATA conductor 25C and is used as an input. Port PA5 is used as an output and is coupled to RDATA conductor 25C through resistor 61 and transistor 58. When PA5 is at a logical "high" level, transistor 58 is biased on, and drives conductor 25C to a "low" level. Otherwise, transistor 58 is off and does not affect conductor 25C, and allows pullup resistor 59C to pull conductor 25C to a high level. A crystal oscillator circuit 52 provides the clock signals necessary for operation of microcontroller 50.

Figure 3A:
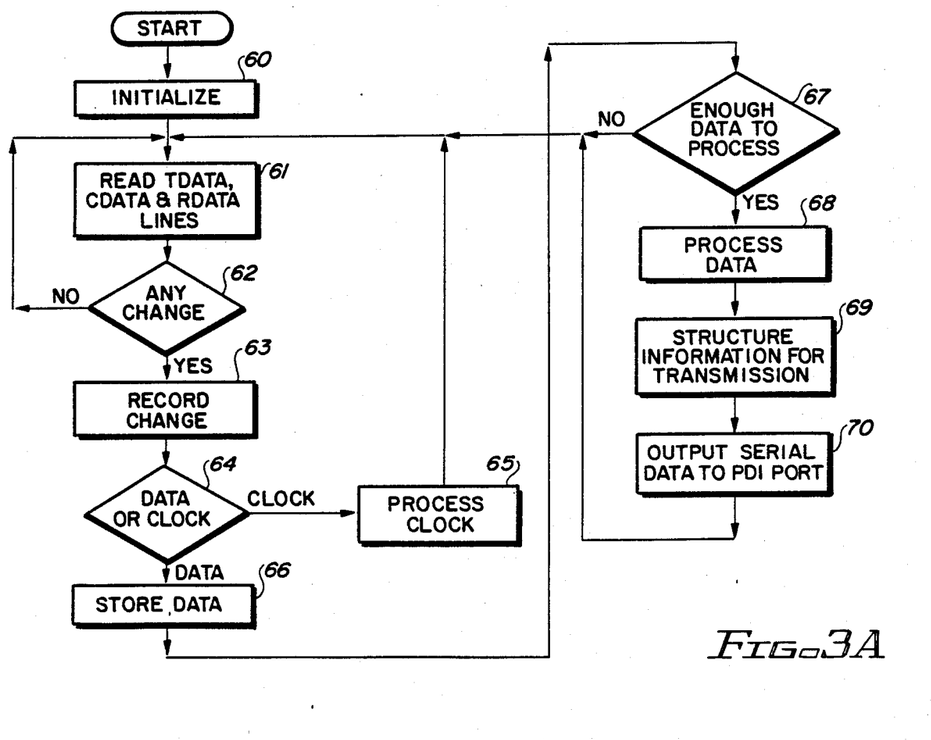
FIG. 3A is a flowchart of a program executed by a microprocessor in the interface circuit of FIG. 3.

Microcontroller 50 executes the program outlined by the flowchart of FIG. 3A to recognize the information represented by the serial signals on conductors 25A–C and generate TTL type signals TD0 and RDI on conductors 53 and 54 which are connected to the PD1 and PD0 serial data terminals of microcontroller 50 and applied to the IN1 and RT1 terminals of a RS232 converter circuit 57. This circuit can be a MAX232 or similar component manufactured by MAXIM Corporation. RS232 converter circuit 57 produces the conventional RS232 ±10 volt NRZ (Non Return to Zero) $T_x$ and $R_x$ signals on conductors 22A and 22B and interfaces to COM1 as shown in FIG. 2.

Referring now to FIG. 3A, a program executed by microcontroller 50 in interface circuit 3 begins by entering block 60 and performing a conventional initialization function, i.e., setting initial values of program variables. The program then goes to block 61 and reads the values of TDATA, CDATA, and RDATA from conductors 25A–C, respectively. The program then goes to decision block 62 and determines if there has been any change in levels on any of conductors 25A–C by detecting a change from the previous state of that line during the previous read time. If there has been no change, the program loops back by returning to the entry point of block 61. If a change has been detected in decision block 62, the program goes to block 63 to record the change. Thus, the loop including decision block 61 and block 62 results in almost instantaneous (within a few microseconds) detection of any changes in states of any of the TDATA, CDATA, and RDATA signals on conductors 25A–C.

In blocks 63 and 64, the program determines whether the detected change represents new data or generation of the clock signal. If it has been determined that the level changes represent a new clock signal, that information is utilized in block 65 to perform further processing based on the clock signal.

If the determination of decision block 64 is that the level change represents data, the program goes to block 66 and stores the represented data in a buffer, and then goes to block 67 and determines if the buffer contains enough stored data to continue processing. If this determination is negative, the program returns to the entry point of block 61 and waits for more data or clock information to be received. If the determination of decision block 67 is affirmative, the program goes to block 68 and processes the data as necessary to determine what type of communication has taken place on the three-wire bus and determine what, if anything, microcontroller 50 should do about it. The program then goes to block 69, structures the necessary information used for transmission to portable PC1, and then goes to block 70 and outputs this information to the serial data port PD1 of microcontroller 50. The program then returns to the entry point of block 61 and executes the above process over again. The serial data transmitted to portable PC 1 from port PD1 is consistent with an established RS-232 protocol that assures proper communication.

Serial data received via conductor 22B and RDI conductor 54 is also processed by microcontroller 50 in such a manner as to allow communication from portable PC 1 to either Interface Circuit 3 or beyond through the RDATA conductor 25C (after processing via microcontroller 50). Communication to Interface Circuit 3 adheres to a protocol developed as necessary to provide the proper control of such communication. Examples of the type of information to be sent to Interface Circuit 3 include baud rate control, time out information, automatic telephone dialing, and other controlling information.

Figure 4A:
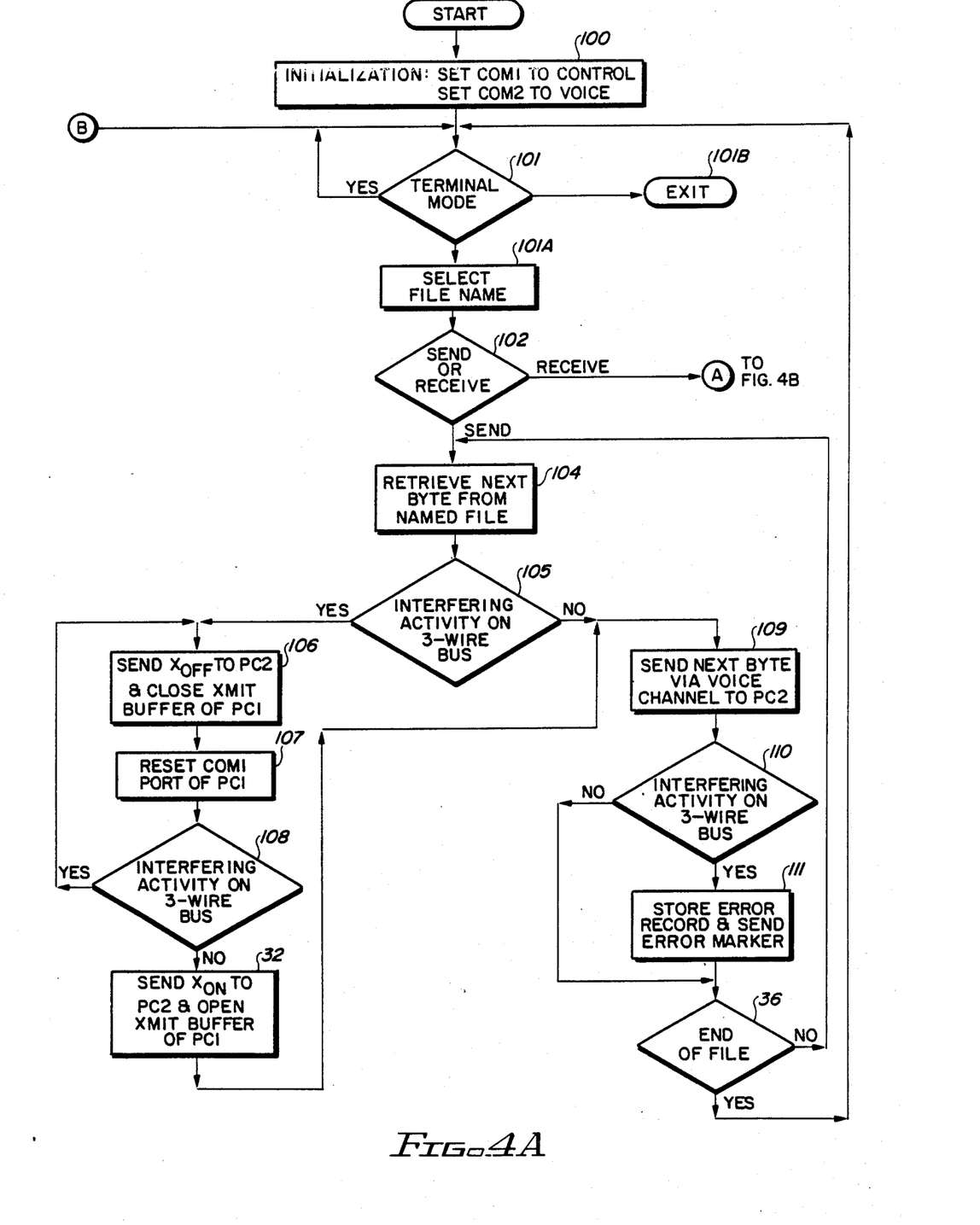
Figure 4B:
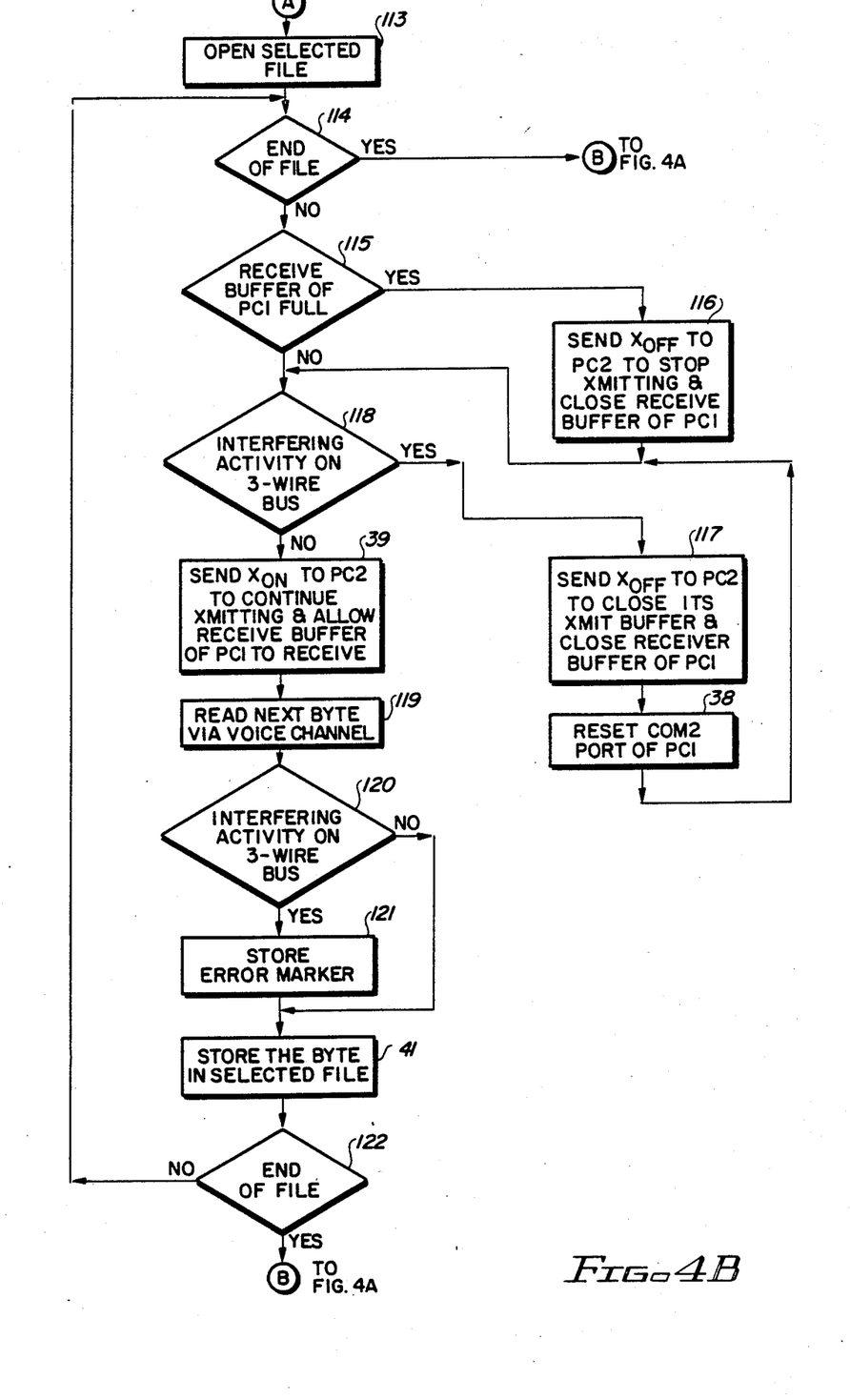

The operation of the mobile unit 19 shown in FIG. 2 to effectuate digital data communications without data loss via CSE unit 4 can be best understood by describing the operation of a "three-wire bus monitor" program executed by portable PC 1. A flowchart of this program is shown in FIGS. 4A–B. A printout of the program is attached hereto as Appendix 1.

Referring now to FIGS. 4A–B, when portable PC 1 is powered up, the three-wire bus monitor program is entered at the START label and executes an initialization routine in block 100, "defining" the communications port COM1 so as to enable it to communicate with control channel 18 of cellular telephone system 1. The initialization routine of block 100 also sets or defines the COM2 port 21 to enable it to communicate with voice channel 17 of cellular telephone system 1. Other conventional initialization tasks performed in block 100 include initialization of certain variables in the program of Appendix 1.

The bus monitor program then goes to decision block 101 and determines if portable PC 1 is in its on-line input mode, i.e., the mode in which it acts as a terminal, waiting to receive a certain keyboard command, program command, or the like. If portable PC 1 is in the on-line mode, the bus monitor program loops back on itself. If the determination of decision block 101 is negative, the bus monitor program goes to block 101A and selects a file name to receive digital data from remote PC 2 or to hold digital data which is to be transmitted from portable PC 1 to remote PC 2. The bus monitor program can be exited via label 101B in response to an exit command.

The three-wire bus monitor program then goes rom block 101A to decision block 102 and determines if portable PC 1 is to send data to or receive data from remote PC 2. This determination is made on the basis of a suitable command from a user program or a keyboard of portable PC 1 or remote PC 2. If decision block 102 determines that the portable PC 1 is to receive digital data, the program goes via label A to block 114 of FIG. 4B. If the determination of decision block 102 is that portable PC 1 is to transmit digital data, the program goes to block 104 and retrieves the next byte of data from the named file in portable PC 1. The program then goes to decision block 105 and determines if there is any "interfering activity" (i.e., handoff or power level adjustment operation or multipath fading) being indicated by three-wire bus 25A–C.

If this determination is negative, the program goes to block 109 and causes portable PC 1 to send the subject byte of data via the COM2 port, modem 24, cellular connector 28, handset 27, cable 31, CSE unit 4, and voice channel 17 to one of transceivers 6. Under the control of BSC 26, that byte of data is transmitted via cellular telephone exchange 8, public switched network 9, and telephone line 34 to modem 11 of remote PC 2.

As soon as the present byte has been transmitted, the program goes to decision block 110 and determines again, by reading the signals from COM1 port 20, whether any interfering activity occurred on three-wire bus 25A–C during the transmission. If not the program returns to block 104 to retrieve the next byte from the named file. However, if interfering activity did occur on the three-wire bus 25A–C during the transmission of the first byte, the program goes to block 111 and stores an error record corresponding to the first byte, and then transmits an error marker via the COM2 communications port 21, CSE unit 4, and voice channel 17 to remote PC 2. This facilitates subsequent sending of an error request identifying and locating all errors that were indicated on the three-wire bus during the transmission.

If the determination of decision block 105 is affirmative, then the program goes to block 106 and sends an $X_{OFF}$ command via communications port COM2, modem 24, voice channel 17, etc., to command remote PC 2 to "close" its receive buffer and stop receiving data in advance of the imminent interfering activity which would generate a gap or interruption in communication that would result in loss of digital data and the undesired insertion of the above-mentioned 463 bit burst.

In block 106, the three-wire bus monitor program also causes portable PC 1 to close its own transmit buffer and stop transmission of the digital data before the imminent handoff, power adjustment operation, multipath fading or the like. The bus monitor program then "resets" COM1 port 20, as indicated in block 107. The bus monitor program then goes to decision block 108 and checks COM1 port 20 to determine if the interfering activity on the three-wire bus is still present. If this determination is affirmative, the bus monitor program reenters block 106, and sends another $X_{OFF}$ command to remote PC 2 via COM2 port 21.

If the determination of decision block 108 is negative, indicating that the interfering activity on the three-wire bus has ended, the bus monitor program goes to decision block 32 and sends an $X_{ON}$ command via the COM2 port 21 of mobile PC 1 and the COM2 port of remote PC 2 to cause remote PC 2 to "open" its receive buffer. The bus monitor program then goes to block 109. The bus monitor program then sends the next byte in its transmit buffer via the COM2 port and the voice channel 17 to remote PC 2. The bus monitor program then goes to decision block 110 and determines again if any interfering activity has begun on the three-wire bus while the last byte was being transmitted to remote PC 2. If this determination is negative, the program goes to decision block 36 and determines whether the present byte is an "end of file" statement. If determination of block 36 is negative, the bus monitor program returns to block 104 and retrieves the next byte from the present file. If the determination of decision block 36 is affirmative, the program returns to decision block 101, already described.

If the determination of decision block 110 is affirmative, indicating that interfering activity began on the three-wire bus during the sending of the last byte to remote PC 2, the bus monitor program then goes to block 111. Ordinarily there would be no affirmative decision in decision block 110, but if there is, it means that the last byte was transmitted despite the occurrence of interfering activity on the three-wire bus. The bus monitor program therefore stores an error record defining the location of the error and thus transmits it to remote PC 2, as indicated in block 111. The error record includes a tilted triangle symbol pointing to the possibly erroneous character, to enable the receiver to conveniently locate the error. Bus monitor program then goes to decision block 36, already described.

If the determination of decision block 102 was that portable PC 1 is to receive data, then the bus monitor program goes to block 113 of FIG. 4B and "opens" the selected file (i.e., the named filed) to receive data from remote PC 2 via the COM2 port 23 and voice channel 17. The bus monitor program then goes to decision block 114 of FIG. 4B and determines if the present byte is the end of file command. If the determination of decision block 114 is affirmative, the program returns via label B to decision block 101 of FIG. 4A.

If the present byte is not at the end of the selected file, the program goes to decision block 115 and determines if the receive buffer of portable PC 1 is full. If it is full, the program goes to block 116 and sends an $X_{OFF}$ command to remote PC 2 via COM2 port 21, modem 24, voice channel 17, etc. to cause remote PC 2 to stop transmitting data to portable PC 1, and then goes to decision block 118. If the determination of decision block 115 is negative, the bus monitor program goes to decision block 118.

At decision block 118 the bus monitor program determines if any interfering activity o the three-wire bus 25A–C indicates imminent handoff, a power adjustment operation, or multipath fading. If so, the bus monitor program goes to block 117 and sends an $X_{OFF}$ command to remote PC 2 via the COM2 port 21, modem 24, voice channel 17, etc., to cause remote PC 2 to stop transmitting data to PC 1, and also causes portable PC 1 to "close" its receive buffer and stop receiving digital data from remote PC 2. The bus monitor program then goes to block 38 and resets COM1 port 23 to its normal state. If no imminent handoff or other interfering activity is detected in decision block 118, the bus monitor program goes to block 39 and sends an $X_{ON}$ command to remote PC 2 via COM2 port 21 and voice channel 17, and then goes to block 119.

In block 119, the bus monitor program reads the next byte received from remote PC 2 via voice channel 17 and COM2 port 21 and then goes to decision block 120 and determines if any imminent interfering activity is indicated by the three-wire bus 25A-C. This would occur if interfering activity started during the reception by portable PC 1 of the last byte from remote PC 2. If this has occurred, the bus monitor program goes to block 121 and stores an error marker identifying the last byte received. In any case, the program goes to block 41 and stores the last byte received in the previously named file in portable PC 1 and then goes to decision block 122 to determine if the most recent byte received and stored is at the end of the present file. If it is not, the program returns to block 114 and if it is at the end of the present file, the bus monitor program returns to decision block 101 of FIG. 4A.

A prototype of the invention which has been constructed interprets certain preselected codes on three-wire bus 25A-C as interfering activity. Interface circuit 3 includes a microprocessor which reads all codes that appear on three-wire bus 25A-C and continually compares them to a lookup table of interference codes. Information identifying specific interference codes appearing on the three-wire bus 25A-C then is transmitted by interface circuit 3 via serial bus 22 and the COM1 port of portable PC 1 to the three-wire bus monitor program, which then can make decisions in accordance with the specific interference code received, in a manner generally similar to that described with reference to FIGS. 4A-B above, and then stops communication via the COM2 port and voice channel 17 when necessary. Command information enabling a voice and data scrambling device for data communications can be sent to the three-wire bus 25A-C via interface circuit 3. For example, information such as a user's name and telephone number can be sent from the keyboard of the portable PC 1 to rather than via the simple keypad of handset 27.

While the invention has been described with reference to a particular embodiment thereof, those skilled in the art will be able to make various modifications to the disclosed embodiment of the invention without departing from the true spirit and scope thereof.

---

APPENDIX 1

```
5     SCREEN 0, 4: COLOR 0, 3: WIDTH 80
6     KEY OFF : CLS : CLOSE : PRINT "Terminal Mode On"
7     DEFINT A-Z : LOCATE 2, 1, 1
Lines 5 thru 7 are initial setup instructions.
10    LINE INPUT "Data Speed ?"; S$
11    C2$ = "COM2:" + S$ + ",N,8,1"
12    OPEN CF$ FOR RANDOM AS #2
Lines 10 thru 12 setup communications port number two, to phone line speeds.
20    C1$ = "COM1: 19200,N,8,1,RS,CS,DS"
21    OPEN C1$ FOR INPUT AS #1
Lines 20 and 21 setup communications port number one, for the Cellular
Phone to computer interface board speeds.
20    XOFF$ = CHR$(19) : XON$ = CHR$(17) : FALSE = 0 : TRUE = NOT FALSE
31    PAUSE = PAUSE
Lines 30 and 31 sets Xon and Xoff and Pause features.
100   K$ = INKEY$ : IF K$ = " " THEN 130          , Online Transmit
110   IF K$ = CHR$(5) THEN 800                    , Ctrl E=Exit program.
120   IF K$ = CHR$(6) THEN 200 ELSE PRINT #2,K$;  , Ctrl F=File transfer.
130   IF EOF(2) THEN 100
140   IF LOC(2) > 128 THEN PAUSE = TRUE : PRINT #2, XOFF$;, —
150   A$ = INPUT$(LOC(2), #2)                     , Online Receive.
160   PRINT A$, : IF LOC(2) > 0 THEN 140
170   IF PAUSE THEN PAUSE = FALSE : PRINT #2, XON$;
180   GOTO 100
The above lines setup an online condition for terminal emulation.
200   LOCATE 25, 1 : PRINT STRING$(80, 32)   : LOCATE 25, 1    , File transfer.
210   LINE INPUT "File name ?"; DF$          : LOCATE 25,30   , DF = Disk file
220   LINE INPUT "(T)ransmit or (R)eceive ?"; X$
230   IF X$ = "T" OR X$= "t" THEN OPEN DF$ FOR INPUT AS #3 : GOTO 500
The above lines enter the Filename and Transmit or Receive the file.
300   OPEN DF$ FOR OUTPUT AS #4              , Receive File.
310   PRINT #2, CHR$(13);                    , Send Carriage Return.
320   IF EOF(2) THEN GOSUB 400               , Pause,Close and Exit to Online
330   IF LOC(2) > 128 THEN PAUSE = TRUE : PRINT #2, XOFF$;
340   IF LOC(1) THEN 600                     , Check comm. port #1, & Reset #1
345   IF LOC(1) THEN PRINT #2, CHR$(17);     , Send Xon out comm. port #2
350   A$ = INPUT$(LOC(2), #2)                , Receive byte thru comm. port #2
355   IF LOC(1) THEN PRINT #2, CHR$(44);     , Send Error marker
360   PRINT #4, A$; : IF LOC(1) >0 THEN 330
370   IF A$ = CHR$(13) THEN PRINT #4, CHR$(13)
380   IF PAUSE THEN PAUSE = FALSE : PRINT #2, XON$;
390   GO TO 320
400   FOR I = 1 TO 5000                                 Pause
410   IF NOT EOF(1) THEN 1 = 9999
420   NEXT I : IF I > 9999 THEN RETURN
440   CLOSE #4 : CLS : LOCATE 25, 30 : PRINT "** Download Complete **"
450   RETURN 590
The above lines represent the programming to receive a file.
500   WHILE NOT EOF(2)                       , Transmit file
```

-continued

```
510   A$ = INPUT$(2, #3)                    , Get byte from Disk File #3
520   IF LOC(1) THEN 700                    , Check comm. port #1, Reset
530   IF LOC(1) THEN PRINT #2, CHR$(17);    , Send Xon out comm. port #2
540   PRINT #2, A$;                         , Send byte out comm. port #2
550   IF LOC(1) THEN PRINT #2, CHR$(44);    , Send left pointing triangle
560   WEND
570   PRINT #2, CHR$(28);
580   CLOSE #3 : CLS : LOCATE 25, 30 : PRINT "** Upload completed **"
590   LOCATE 1, 1 : GOTO 31
The above lines represent the programming to transmit a file.
600   PAUSE = TRUE : PRINT #2, XOFF$;       , Receive interrupt subroutine
610   CLOSE #1 : OPEN C1$ FOR INPUT AS #1 : GOTO 340
Lines 600 and 610, Refer to lines 700 and 710.
700   PAUSE = TRUE : PRINT #2, XOFF$;       , Transmit interrupt subroutine
710   CLOSE #1 : OPEN C1$ FOR INPUT AS #1, GOTO 520
Line  700   pauses the program and sends an Xoff out the Communications
            port #2.
Line  710   resets communications port #1 to the interface board, then
            returns to the beginning of program line 520, which it left,
            because of the detection of an error in the first place.
800   BEEP : CLOSE : PRINT "Terminal mode Off" : END
```

The above program is the example in the MS-DOS BASIC manual.
Lines were added to the program for the interface board.
The above program represents the Xon Xoff portion only.
The transmit example of lines [510] thru [550] shows that when a character
is input from the Disk File #3 [510], activity is first checked on comm. #1
[520].
If the answer is No interference the character is sent out port #2 [540].
Comm. #1 [550] is again checked for three wire bus activity.
If the answer is No interference the program continues to send the
character out to the cellular connection, over the voice channel, to the
other computer.
If a byte is located at comm. #1 [520] and the answer is Yes to
interference on the three wire bus, the program jumps to line [700] as
described below.
First an Xoff is sent thru comm. #2 [700] which stops the other computer.
Next comm. #1 [710] is reset to again check the cellular phone's interface
board.
Then comm. #1 [520] is checked again and continues in this loop
[520->700->710->520] until comm. #1 [520] is clear of activity with an
answer of No interference then sends an Xon thru comm. #2 [530] which sets-
up the other computer for the retry.
Then the character input from Disk File #3 [510] is sent out comm. #2
[540].
Line 550 checks comm. #1 for interference during the transmitting of line
540.
If the answer is No interference the program continues to send the
character out to the cellular connection and over the voice channel.
If the answer is Yes a record is kept and a marker is sent out comm. #2
[550].
Therefore a byte of data cannot be sent until comm. #1 is clear and then
re-checked after sending the byte of data, insuring that only one byte of
data could be sent in error (with a left pointing marker) instead of many
bytes of cellular system data ruining the data transmission on the voice
channel.
A record of all errors will be stored and sent at the end of the
transmission, if an error occurs while sending a character on line 540.

APPENDIX 1

What is claimed is:

1. A method for avoiding data loss during computer communications over a cellular telephone system including a control channel conveying TDATA, CDATA, and RDATA signals and a voice channel, comprising the steps of:
   (a) monitoring states on TDATA, CDATA, and RDATA conductors of a cellular subscriber equipment unit, and converting a plurality of those states to an interference code while exchanging digital data between first and second computers over the voice channel;
   (b) sending the interference code to the first computer;
   (c) operating the first computer to recognize an interference condition such as an imminent handoff, power adjustment, or multipath fading in response to the interference code;
   (d) halting the exchanging of digital data between the first and second computers before the interference condition occurs;
   (e) continuing the exchanging of digital data between the first and second computers after the interference condition ends.

2. The method of claim 1 wherein the exchanging of digital data includes sending digital data from the first computer via a first mode to the cellular subscriber equipment unit via an antenna thereof and the voice channel to an antenna of a base receiver, and through a base site controller, a cellular telephone exchange, a public switched network, and a second modem to the second computer.

3. The method of claim 2 wherein the monitoring of the states includes sensing TDATA, CDATA, and RDATA signals on the TDATA, CDATA, and RDATA conductors, respectively, by means of an interface circuit coupled between the cellular subscriber equipment unit and the first computer.

4. The method of claim 3 wherein the exchanging of digital data includes coupling digital data to and from the first modem and the cellular subscriber equipment unit by means of a cellular connector and the interface circuit, the interface circuit having a plug in connector into which the cellular connector is plugged, the cellular connector having a plug in connector into which a handset is plugged.

5. The method of claim 4 including continuous monitoring of states on the TDATA, CDATA, and RDATA conductors after step (d) and continuing to convert a plurality of those states to the interference code and recognizing the ending of the interference code.

6. The method of claim 4 including operating the first computer to send an $X_{OFF}$ command via the voice channel to the second computer in response to the interference condition, and sending an $X_{ON}$ from the first computer via the voice channel to the second computer when the interference condition has ended.

7. The method of claim 1 including, before step (a), determining if the present exchanging of digital data between the first and second computers includes sending of the digital data from the first computer to the second computer or receiving digital data by the first computer from the second computer.

8. The method of claim 7 wherein, if the exchanging of digital data includes sending digital data by the first computer to the second computer, step (d) includes operating the first computer to send an $X_{OFF}$ in response to the recognizing of step (c), continuing to monitor states on the TDATA, CDATA, and RDATA conductors and then recognizing the ending of the interference condition, and then sending an $X_{ON}$ command via the voice channel from the first computer to the second computer to effectuate step (e).

9. The method of claim 8 including causing the first computer to send a next byte via the voice channel to the second computer if no interference condition exists.

10. The method of claim 9 including monitoring the states on the TDATA, CDATA, and RDATA conductors after the sending of the next byte and generating and storing an error record if an interference condition exists, and then sending another byte via the voice channel to the second computer.

11. The method of claim 9 wherein if the exchanging of digital data includes receiving digital data to the first computer from the second computer, step (d) includes operating the first computer to send an $X_{OFF}$ in response to the recognizing of step (c), continuing to monitor states on the TDATA, CDATA, and RDATA conductors and then recognizing the ending of the interference condition, and then sending an $X_{ON}$ command via the voice channel from the first computer to the second computer to effectuate step (e).

12. The method of claim 11 including causing the first computer to send an $X_{OFF}$ command from the first computer to the second computer to cause the second computer to stop transmitting if an interference condition exists.

13. The method of claim 1 wherein step (a) includes comparing the monitored states to stored codes to determine if the monitored states represent the interference code.

14. A system for avoiding data loss during computer communications over a cellular telephone system including a control channel conveying TDATA, CDATA, and RDATA signals and a voice channel, the system comprising in combination:
 (a) means for monitoring states on TDATA, CDATA, and RDATA conductors of a cellular subscriber equipment unit;
 (b) means for converting a plurality of those states to an interference code while exchanging digital data between first and second computers over the voice channel and sending the interference code to the first computer;
 (c) means in the first computer for recognizing an interference condition such as an imminent hand-off, power adjustment, or multipath fading in response to the interference code;
 (d) means in the first computer for halting the exchanging of digital data between the first and second computers before the interference condition occurs;
 (e) means in the first computer for continuing the exchanging of digital data between the first and second computers after the interference condition ends.

15. The system of claim 14 including a first modem sending digital data from the first computer to the cellular subscriber equipment unit via an antenna thereof and the voice channel to an antenna of a base receiver, and through a base site controller, a cellular telephone exchange, a public switched network, and a second modem to the second computer.

16. The system of claim 15 including an interface circuit through which the TDATA, CDATA, and RDATA conductors extend coupled between the cellular subscriber equipment unit and the first computer, the interface circuit having a plug in connector into which a cellular connector is plugged to make connection to the TDATA, CDATA, and RDATA conductors and to the audio Rx conductor and the audio Tx conductor, the interface circuit including the reading means, the reading means sensing TDATA, CDATA, and RDATA signals on the TDATA, CDATA, and RDATA conductors.

17. The system of claim 16 wherein the interface circuit includes a plug in connector into which the cellular connector is plugged, the cellular connector having a plug in connector into which a handset is plugged.

18. The system of claim 17 wherein the first and second computers are IBM-compatible PCs.

19. The system of claim 17 including means for continuing reading states on the TDATA, CDATA, and RDATA conductors and continuing to convert a plurality of those states to the interference code as long as the interference condition exists and recognizing the ending of the interference condition when the interference code is no longer present.

20. The system of claim 17 wherein the halting means includes means for sending an $X_{OFF}$ command via the voice channel to the second computer in response to the interference code, and wherein the continuing means includes means for sending an $X_{ON}$ from the first computer via the voice channel to the second computer when the interference code has ended.

21. The system of claim 16 wherein the interface circuit includes means for comparing the monitored states to stored codes to determine if the monitored states represent the interference code.

* * * * *